United States Patent Office 3,510,635
Patented May 5, 1970

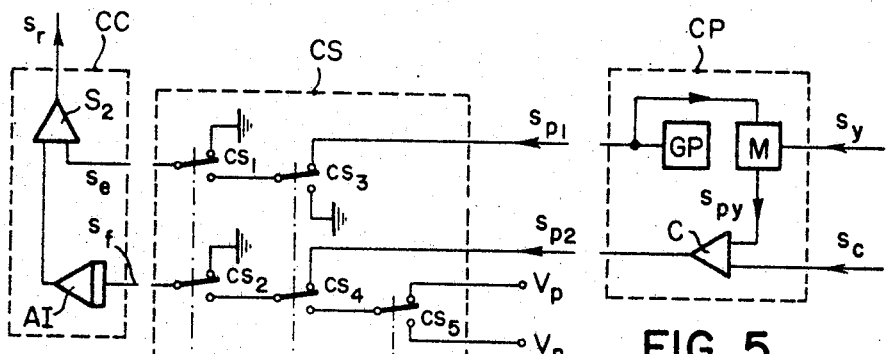
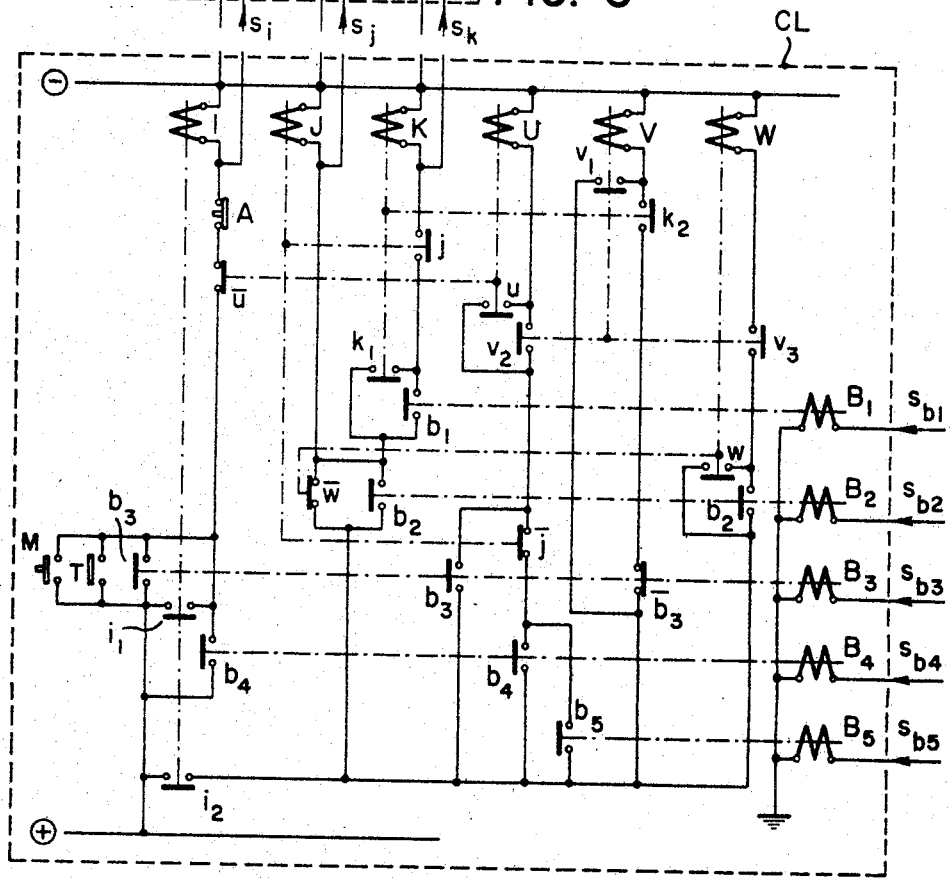

3,510,635
APPARATUS FOR RENDERING EXTREMAL THE VALUE OF AN INSTALLATION OPERATING CRITERION
Roland Rouxel, Troinex, Geneva, and Claude Sourisse, Grand-Lancy, Geneva, Switzerland, assignors to The Battelle Development Corporation, Columbus, Ohio, an American body corporate
Filed Aug. 10, 1966, Ser. No. 571,526
Claims priority, application Switzerland, Aug. 17, 1965, 11,554/65
Int. Cl. G05b 13/00
U.S. Cl. 235—150.1                          2 Claims

ABSTRACT OF THE DISCLOSURE

Control apparatus for rendering the value of an installation operating criterion extremal by acting on at least one regulating quantity of the installation, comprises a device for continuously producing a pilot signal whose value is a linear function of at least one of three quantities, namely the instantaneous value of the criterion and its first derivative in time and its second derivative in time, the signal being compared with a plurality of reference sgnals so as to trigger off a searching cycle at predetermined time intervals and when the amplitude of said pilot signal reaches either a first predetermined, positive, boundary value or a second predetermined, negative, boundary value to find the optimal value of the regulating quantity which corresponds to the extremal value of the criterion.

The present invention relates to apparatus for rendering extremal the value of an operating criterion of an installation by acting on at least one regulating quantity thereof.

Known optimalization methods generally consist in varying one or more regulating quantities so as to render maximal or minimal an operating criterion of a process, which may either be measured directly or be calculated from other measured parameters.

In order for such optimalization of a process to be made possible, it is thus necessary to select an operating criterion as well as the regulating quantity in order for this criterion to pass through an extremum when said regulating quantity is made to vary.

The operating characteristics of an installation are represented by curves, termed static characteristics, of which the abscissae correspond to a regulating quantity and the ordinates correspond to the operating criterion. Each of these static characteristics thus represents the operation of the installation in terms of a regulatable quantity, when all other parameters of the process liable to affect the value of this criterion are kept constant. Optimalization seeks to keep an operating criterion at its extremal value by acting on the regulating quantity, despite the variations of the other parameters, the effect of which is to shift the static characteristic of the installation.

Among the various methods for achieving this object, the optimalization methods termed "without mathematical pattern," of which the method according to the present invention is one, have the advantage of not requiring knowledge of the static characteristics of the process under consideration since these methods consist in subjecting the regulating quantity to successive disturbances in accordance with a given law, the nature of which depends on the selected method of optimalization, and in determining the effect of each disturbance on the operating criterion, thereby to trigger off the next disturbance so as to cause the operating criterion to progress towards its optimal value and to keep it at this value. Aleatory variations of the other above mentioned input parameters, termed uncontrolled variables, of the process have the effect of causing this process to change its working characteristic, thereby having to trigger off a searching cycle to determine the optimum that corresponds to this new characteristic. To carry out an extremum search, three main classes of optimalization methods are available, to wit:

(1) *The so-called "static" optimalization methods.*—In which the regulating quantity is made to vary in a succession of steps separated by pauses that are sufficiently long to enable the system to have a new stable state. After each step, the direction and the amplitude of the corresponding variation of the operating criterion to the optimalized are determined and from this is deduced the direction, and possibly also the amplitude, of the next variation having to be imparted to said quantity. Once the extremum of the criterion has been reached, the system is maintained in this state until a change in the static characteristic is brought about by fresh variations in the other parameters of the system. These static methods all require a relatively long period of time to reach optimal working conditions. Further, the interpretation of the effect on the working criterion, due to the disturbance imposed on the regulating quantity, can be distorted by the presence of unknown disturbances and lead to instability of control.

(2) *The so-called "continuous periodic disturbance" methods.*—In which the regulating quantity is controlled by a signal consisting of the sum of two signals, i.e., a low amplitude periodic disturbance signal and a "shift" signal for approaching the optimum. This latter signal is obtained by elaborating the time integral of the product of the operating criterion and of the periodic disturbance signal. These methods are particularly suited for searching an optimum in the presence of noise signals superposed on the operating criterion measurement. With these methods, however, the optimum searching time is long and thus restricts their effectiveness in the presence of substantial disturbances.

(3) *The so-called "dynamic" methods.*—In which the regulating quantity is subjected to a continuous and relatively rapid progressive variation and in which the direction of varition of this quantity is swtched in accordance with a predetermined law in dependence on the corresponding variations of the operating criterion or of its time derivatives. Although these methods enable a rapid determination of the optimum, their effectiveness decreases very rapidly in the presence of noise signals that are superposed on the operating criterion measurement.

An object of the invention is, on the one hand, to combine in a single control method the advantages of quickess of the dynamic method and of effectiveness, in the presence of noises, of the so-called continuous periodic disturbance method, and, on the other hand, to enable optimalization of processes subjected to constraints, i.e., in which certain working zones, including possibly the optimum itself, are prohibited.

The present invention is concerned with the application of the method to a heat generator, whereby the intake of combustion air may be controlled to keep fuel consumption at a minimum and whereby a predetermining physical quantity, in particular the output temperature of a fluid heated by the generator, may simultaneously be maintained at an index value. This application comprises continuously elaborating a signal which is proportional to the difference between said index value and the measured value of said physical quantity; controlling fuel flow in proportion to the sum of said signal, its integral and its first time derivative; using said signal as a pilot signal to carry out said searching cycle for finding the optimal air intake value; carrying out said first dynamic searching phase by progressively increasing the air intake until said signal reaches a predetermined positive switching threshold and by then decreasing this intake until said first phase is ended at said second, negative, boundary value; and subsequently triggering off said second phase by continuous periodic disturbance of the air intake.

The invention also provides control apparatus for rendering extremal the value of an installation operating criterion by varying at least one regulating quantity of the installation, through the intermediary of a signal responsive regulating element associated with said installation, in accordance with a searching cycle, which includes, first, dynamic, searching phase and a second phase by continuous periodic disturbance, to find the optimal value of said regulating quantity corresponding to the extreme value of said criterion, which apparatus comprises measuring and calculating means adapted for connection to said installation to produce continuously a pilot signal having a value which is a linear function of at least one of three quantities, namely the instantaneous value of the criterion, its first time derivative and its second time derivative; constant voltage source means; periodic disturbance circuit means connected to said measuring and calculating means to receive therefrom said pilot signal and adapted to produce a first, periodic, disturbance signal and a second disturbance signal corresponding to the product of the pilot signal and of said first, periodic, disturbance signal; control circuit means adapted for connection to said regulating number to deliver thereto a control signal for controlling said regulating quantity; selector circuit means connected to said voltage source means, to said disturbance circuit means and to said control circuit means for selectively connecting said control circuit means to said voltage means during said first searching phase, during which said control signal is made to vary progressively in accordance with a predetermined law, and to said periodic disturbance circuit means during said second phase, during which said control signal is made to vary in dependence on said first, periodic, disturbance signal and of a signal which is proportional to the time integral of said second disturbance signal; and triggering and logic circuit means connected to said measuring and calculating means to receive therefrom said pilot signal and connected to said selector circuit means to deliver thereto selection signals produced therein, said triggering and logic circuit means including reference signal source means for supplying a plurality of constant value reference signals, a periodic trigger source, and a corresponding plurality of bistable triggers each for comparing said pilot signal with one of said reference signals and for delivering a triggering signal when said pilot signal reaches the value of said one reference signal, and said triggering and logic circuit means being adapted to trigger off said first, dynamic, searching phase of said searching cycle by a signal delivered at predetermined time intervals by said periodic trigger signal source and each time said pilot signal reaches either a first, positive, boundary value corresponding to a first of said reference signals or a second, negative, boundary value corresponding to a second of said reference signals through connecting said control circuit means to said voltage means, to trigger off said second searching phase of said searching cycle when said pilot signal reaches, for the second time, a third boundary value corresponding to a third of said reference signals through disconnecting said control circuit means from said voltage means and connecting said control circuit means to said periodic disturbance circuit means, and to stop said searching cycle when the aperiodic component of the pilot signal reaches a fourth boundary value corresponding to a fourth of said reference signals through disconnecting said control circuit means from said periodic disturbance circuit means.

In the accompanying drawings:

FIG. 4 shows a constructional form for the logic circuit CL of FIG. 1;

FIGS. 5, 6 and 7 show respectively a constructional form for the periodic disturbance circuit CP, the selector circuit CS and the control circuit CC of FIG. 1;

Figure 1:
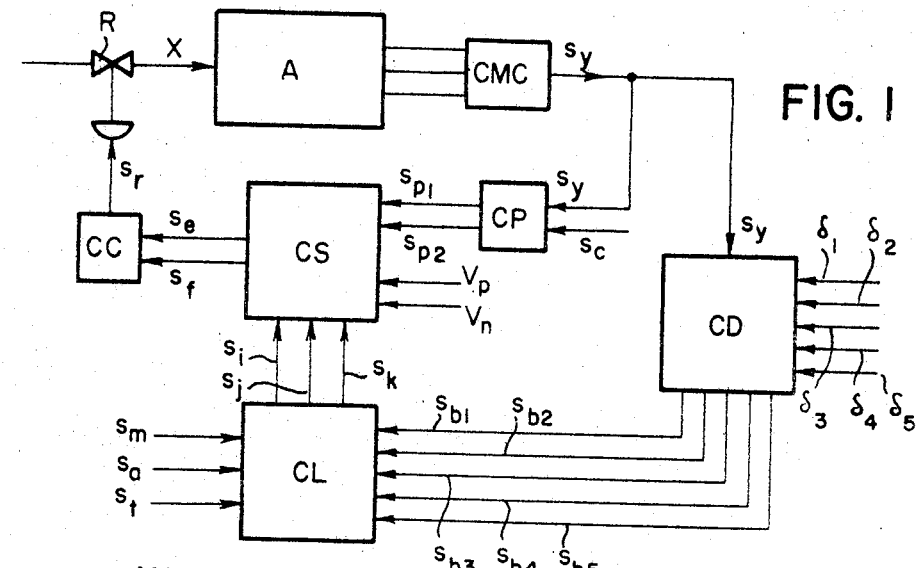
FIG. 1 is a functional diagram of a first embodiment of the apparatus according to the invention.

The apparatus diagrammatically represented in FIG. 1 is intended to optimalize the operation of an installation A, i.e., to bring an operating criterion Y of this installation to its extremal value, by acting on an input variable X thereby by means of a regulating element R. This apparatus comprises the following components:

(a) a measuring and calculating circuit CMC;
(b) a triggering circuit CD;
(c) a logic circuit CL;
(d) a periodic disturbance circuit CP;
(e) a selector circuit CS; and
(f) a circuit CC for controlling element R.

The device CMC serves to measure several output variables of the installation A, to calculate therefrom the value of the operating criterion Y and of its first and second derivatives, and to elaborate a pilot signal $s_y$ which is a linear function of the calculated values. This signal $s_y$ is continuously fed to the circuits CD and CP. The triggering circuit CD, which serves to control the various optimum searching stages, receives, simultaneously with signal $s_y$, five reference signals $\sigma_1$, $\sigma_2$, $\sigma_3$, $\sigma_4$, ($=-\sigma_3$) and $\sigma_5$, whose constant values correspond to the triggering thresholds of the various stages of the searching cycle, and transmits five signals $s_{b1}$, $s_{b2}$, $s_{b3}$, $s_{b4}$, $s_{b5}$ to the logic circuit CL. The latter simultaneously receives starting signals $s_m$ and $s_t$ and a stopping signal $s_a$ issuing from a manual control device (signals $s_m$ and $s_a$) and from a clock (signal $s_t$). The logic circuit CL generates three signals $s_i$, $s_j$ and $s_k$ which are transmitted to the selector circuit CS.

The periodic disturbance circuit CP receives the signals $s_y$ and $s_c$ and transmits two signals $s_{p1}$ and $s_{p2}$ to the selector circuit CS. The latter transmits two signals $s_e$ and $s_f$ to the control circuit CC which generates the control signal $s_r$ for control element R.

The measuring and calculating circuit CMC shown in FIG. 1 comprises three measuring devices $AM_1$ and $AM_3$ which generate signals $s_{m1}$, $s_{m2}$ and $s_{m3}$ corresponding to the respective values of the output variables on which depends the operating criterion Y which is to be optimalized. An analog computer CA elaborates the instantaneous value of criterion Y from signals $s_{m1}$, $s_{m2}$ and $s_{m3}$ and generates a signal $s_Y$ corresponding to this value Differentiators D' and D'' respectively elaborate the first and second time derivatives of criterion Y and generates signals $s_{Y'}$ and $s_{Y''}$. The three signals $s_Y$, $s_{Y'}$ and $s_{Y''}$ are transmitted to an adder $S_1$ which elaborates a pilot signal $s_y$ representing a linear algebraic combination of these three signals ($s_y = \alpha \cdot s_Y + \beta \cdot s_{Y'} + \gamma \cdot s_{Y''}$).

Figure 3:
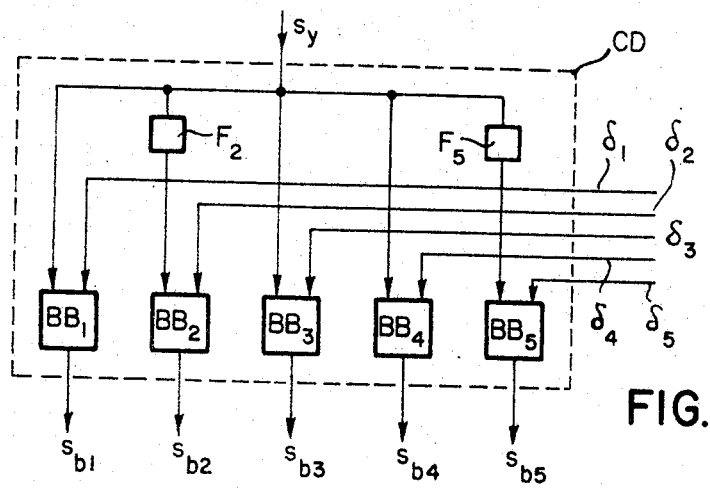
FIG. 3 shows a constructional form for the triggering circuit CD of FIG. 1.

The triggering circuit CD shown in FIG. 3 comprises five flip-flops $BB_1$, $BB_2$, $BB_3$, $BB_4$ and $BB_5$ which each receive the pilot signal $s_y$ and one of the reference signals $\sigma_1$ to $\sigma_5$. Each of the flip-flops $BB_1$ to $BB_5$ changes from one state to the other whenever the signal $s_y$ passes, one way or the other, through the value of the associated reference signal $\sigma$. These five flip-flops respectively generate binary signals $s_{b1}$, $s_{b2}$, $s_{b3}$, $s_{b4}$ and $s_{b5}$ which are transmitted to the logic circuit CL. These flip-flops are so arranged that their output signal has a value of zero when the amplitude of their input signal is less than that of their respective reference signal. As may be seen from this figure, signals $s_y$ passes through filters $F_2$ and $F_5$ before proceeding to the flip-flops $BB_2$ and $BB_5$ respectively.

The disturbance circuit CP shown in FIG. 5 comprises a multiplier M and a generator GP producing a continuous periodic disturbance signal $s_{p1}$. The multiplier M receives signals $s_{p1}$ and $s_y$ and generates a signal $s_{py}$ which is proportional to the product of these two signals. Circuit CP moreover comprises a comparator C which generates a signal $s_{p2}$ corresponding to the difference between the signal $s_{py}$ and a reference signal $s_c$. The transmission of signals $s_{p1}$ and $s_{p2}$ to the control circuit CC (FIG. 7) is controlled by the selector circuit CS (FIG. 6).

The logic circuit CL represented in FIG. 4 comprises five primary relays $B_1$, $B_2$, $B_3$, $B_4$ and $B_5$ which are energized when they respectively receive signals $s_{b1}$ to $s_{b5}$ having a value of 1, to close the associated contacts $b_1$ to $b_5$ and vice versa. This circuit CL further comprises three intermediate relays U, V and W, and three primary relays I, J and K. These relays U, V and W and I, J, K, respectively control contacts $u$, $v$, $w$ and $i$, $j$, $k$. The respective energization of relays I, J and K generates signals $s_i$, $s_j$ and $s_k$ which are transmitted to the selector circuit CS.

The selector circuit represented in FIG. 6 comprises three secondary relays I', J' and K' which are energized (when receiving signals $s_i$, $s_j$ or $s_k$ having a value of 1) at the same time as the relays I, J and K of the logic circuit CL and which respectively control the position of the selection switches $cs_1$ and $cs_2$; $cs_3$ and $cs_4$; and $cs_5$. These switches connect the control circuit CC to the disturbance circuit CP and either to the positive voltage source $V_p$ or to the negative source $V_n$.

The control circuit CC, reprsented in FIG. 7, comprises an integrator AI which can be connected either to the comparator C, to the positive voltage source $V_p$, or to the negative voltage source $V_n$, depending on the position of the switches $cs_2$, $cs_4$ and $cs_5$. The signal $s_t$, which is time integrated in the integrator AI, is thus either the signal $s_{p2}$ or one of the voltages $V_p$ and $V_n$. The control circuit CC comprises also an adder $S_2$ which adds the signals $s_{p1}$ and the integral of signal $s_f$ to produce a signal $s_r$ which controls the regulating element R.

Figure 8:
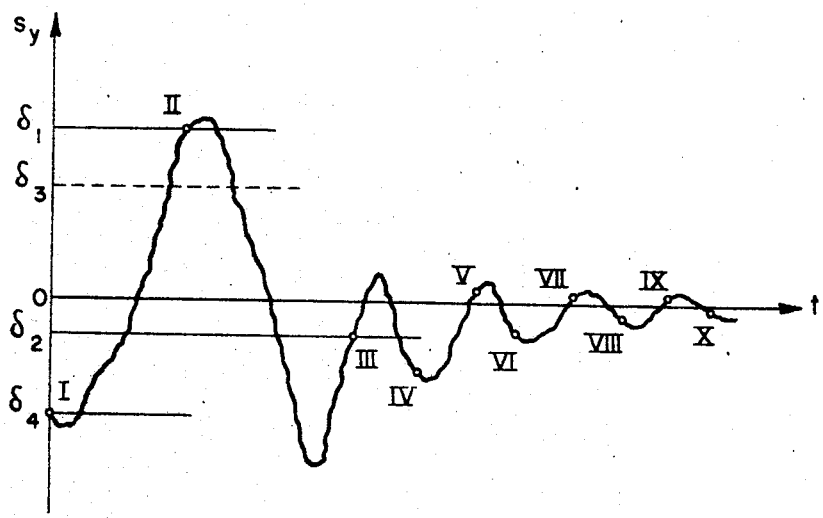
FIG. 8 illustrates by way of example the progress in time of the pilot signal $s_y$ while searching for a minimum.

FIG. 8 represents, by way of example, the evolution in time of the pilot signal $s_y$ during a minimum searching cycle. It has been supposed here that this cycle begins when $s_y = \sigma_4$.

The apparatus described above and illustrated in FIGS. 1 to 7 operates as follows:

When installation A is working, circuit CMC continuously elaborates the pilot signal $s_y$. The searching cycle for finding the optimal value of the regulating quantity X is triggered off on the one hand either by the manual signal $s_m$ which closes contact M or by the clock signal $s_t$ which closes contact T, and on the other hand each time the value of signal $s_y$ reaches either the positive threshold $\sigma_3$ or the negative threshold $\sigma_4$ thereby energizing relay $B_3$ or $B_4$ to close contact $b_3$ or $b_4$. The reference signals $\sigma_3$ and $\sigma_4$, which correspond to the first boundary value of the pilot signal $s_y$ that causes a searching cycle to be triggered off, have substantially the same value but have opposite signs. Their value is chosen so as to be greater than the maximal amplitude of the aleatory "noise" signals of the pilot signal. Since contacts $\overline{u}$ and A of the logic circuit CL (FIG. 4) are in their normal closed position, the primary relay I is initially energized by the closure of contact $b_3$ or $b_4$ and is then kept energized by the contact $i_1$. The energization of relay I and the consequent closure of contact $i_2$ bring about energization of relay J, as contact $\overline{w}$ is in its normal closed position. Relays I' and J' of the selector circuit CS (FIG. 6) are energized simultaneously with the relays I and J and actuate switches $cs_2$ and $cs_3$ so as to connect the input of the integrator AI to the positive voltage source $V_p$, since relay K' is not energized. Thus, the output signal of the integrator increases in a predetermined direction in a constant manner and the adder $S_2$ transmits a signal $s_r$ which corresponds to this signal since the circuit CP is disconnected through closure of contacts $cs_3$ and $cs_4$ and does not therefore transmit to the adder $S_2$ the disturbance signals $s_{p1}$ and $s_{p2}$. The progressive variation of the regulating quantity X thus obtained by means of the regulating element R, results in a progressive variation of the criterion Y and hence of the signal $s_y$ (see FIG. 8, stage I–II), until the value of this signal reaches the value of the reference signal $\sigma_1$, thereby actuating flip-flop $BB_1$ and producing a signal $s_{b1}$, having a value of 1, which energizes relay $B_1$ to close contact $b_1$. Thus relay K is energized by the closure of contact $b_1$, contacts $\overline{w}$, $i_2$ and $j$ being closed, and is kept energized by the contact $k_1$. The relays I', J' and K' are now all energized, thereby moving switches $cs_2$, $cs_4$ and $cs_5$ to a position in which the integrator input is connected to the negative constant voltage source $V_n$. Thus the passage of signal $s_y$ through the threshold $\sigma_1$, and hence the energization of the third primary relay K, has the effect of reversing the direction of the progressive variation of quantity X (see stage II–III, FIG. 8). Consequently, the signal $s_y$, after a delay due to the lag of the installation, decreases and then crosses the threshold $\sigma_3$. This causes the signal $s_{b3}$ to pass from 1 to 0 and relay $B_3$ to be deenergized. Since relay K is energized, relay V then becomes energized through the intermediary of contacts $i_2$, $\overline{b}_3$ and $k_2$ and is kept energized by contact $v_1$. The signal $s_y$ continues to decrease, passes through the value zero, and reaches the value of the reference signal $\sigma_2$, whose sign is opposite that of signal $\sigma_1$ and whose amplitude is substantially less than that of this signal.

When the signal $s_y$ reaches the value of signal $\sigma_2$, relay $B_2$ receives a signal having a value of 1, becomes energized and closes contact $b_2$, thereby energizing relay W through the intermediary of the closed contacts $v_3$ and $i_2$. Relay W is kept energized by contact $w$. Relay K remain energized through the intermediary of contacts $i_2$, $b_2$, $k_1$ and $j$ and relay J remains energized through the intermediary of contacts $i_2$ and $b_2$. This progressive variation of the regulating quantity X thus continues so that the signal $s_y$ may reach an extremal value and may again decrease until its value passes through the value of reference signal $\sigma_2$ a second time (at point III in FIG. 8). As a result, the signal $s_{b2}$ becomes 0, relay $B_2$ is de-energized, contact $b_2$ opens and relays J and K are de-energized. At this point, the first dynamic searching phase is over and the input of the control circuit CC is connected to the periodic disturbance circuit CP, i.e., the signals $s_{p1}$ and $s_{p2}$ respectively pass through switches $cs_3$, $cs_1$ and $cs_4$, $cs_2$ at the input of the adder $S_2$ and of the integrator AI.

One thus passes from dynamic operation to searching by superposed periodic disturbance. The signal $s_{p1}$ produced in the generator GP is in fact a periodic signal of small amplitude which is superposed in the adder $S_2$ on the output signal of integrator AI, the sum of these signals being the control signal $s_r$ of the regulating quantity X. The resulting periodic variations in the value of signal $s_r$ and in the quantity X are reflected in the operating criterion Y and hence in the pilot signal $s_y$.

As mentioned above, the product of the disturbance signal $s_{p1}$ and of the signal $s_y$ is added to the signal $s_c$ of predetermined value in the comparator C to produce the signal $s_{p2}$ which is fed to the input of integrator I. This second searching phase (III to X, FIG. 8) by continuous periodic disturbance results in quantity X progressing towards the optimal value corresponding to the extremal value of criterion Y. Consequently, the amplitude of the pilot signal $s_y$ decreases and when the aperiodic component of this signal (obtained by filter $F_5$) reaches the lower value of signal $\sigma_5$, flip-flop $BB_5$ emits a signal $s_{b5}$ which energizes the auxiliary relay $B_5$ and hence closes contact $b_5$ to energize relay U through the close contacts $v_2$, $\bar{j}$, and $i_2$. When relay U is energized, contact $\bar{u}$ opens thereby de-energizing relay I and hence opening contact $i_2$ to de-energize the other relays J, K, U, V and W. The switches $cs_1$ to $cs_4$ thus move to their rest position shown in FIG. 6, thereby stopping the variation of X and ending the searching cycle. The value of the constant signal $s_c$ determines the difference between the effective stopping position of the regulating quantity and the position corresponding to the extremal point. This difference is provided in those instances where the constraints of the process under consideration prohibit static operation at the extremal point. The apparatus is thus brought to the waiting phase in which the regulating quantity X is kept constant until a fresh searching cycle is triggered off.

It may however occur that a large disturbance takes place during the dynamic searching phase and shifts the static characteristic in such a way that the signal $s_y$, after having reached the threshold $\sigma_1$, decreases but does not reach the threshold of opposite sign $\sigma_2$. In this instance, the second searching phase (by continuous periodic disturbance) cannot be triggered off so that the regulating quantity X continues to progress in the same direction. This results in an increase of $s_y$ which in the end reaches a predetermined value, in the present instance the threshold $\sigma_3$, which has the same sign as $\sigma_1$. This causes energization of relay $B_3$. Since contact $v_2$ in the energization circuit of relay U is closed, as also contact $i_2$, relay U is energized and is self-supplied via contact $u$ and relay I is de-energized through contact $\bar{u}$ being opened. Contact $i_2$ then also opens thereby causing de-energization of relays I, J and J', relays K and K' and relays U, V and W. Since relay $B_3$ is still energized and contact $\bar{u}$ is again closed, relay I is again energized via contact $b_3$ and a fresh dynamic searching phase is initiated. Moreover, when a large disturbance occurs in the installation during the second searching phase, i.e., during operation by superposed periodic disturbance (in which relay J is not energized and relay V is), flip-flop $BB_3$ or $BB_4$ emits a signal which energizes relay $B_3$ or $B_4$, thereby closing contact $b_3$ or $b_4$. This results in relay U being energized via contacts $i_2$, $b_3$, or $b_4$, $\bar{j}$ and $v_2$ and in contact $\bar{u}$ being opened, thereby deenergizing relay I and opening contact $i_2$ to de-energize relays J, K, U, V and W. Thus, contact $\bar{u}$ closes again and since contact $b_3$ or $b_4$ is closed as a result of said aleatory disturbance, relays I and J are re-energized and a fresh searching cycle is initiated as described above.

These latter two modes of operation, i.e., by interrupting and restarting the searching cycle, during the "dynamic" phase on the one hand, and during the periodic disturbance searching phase on the other hand, ensure the safety of the installation having to be optimized, should the latter be subjected to a constraint, by preventing in particular its operation in certain zones of the characteristic curves.

Figure 9:
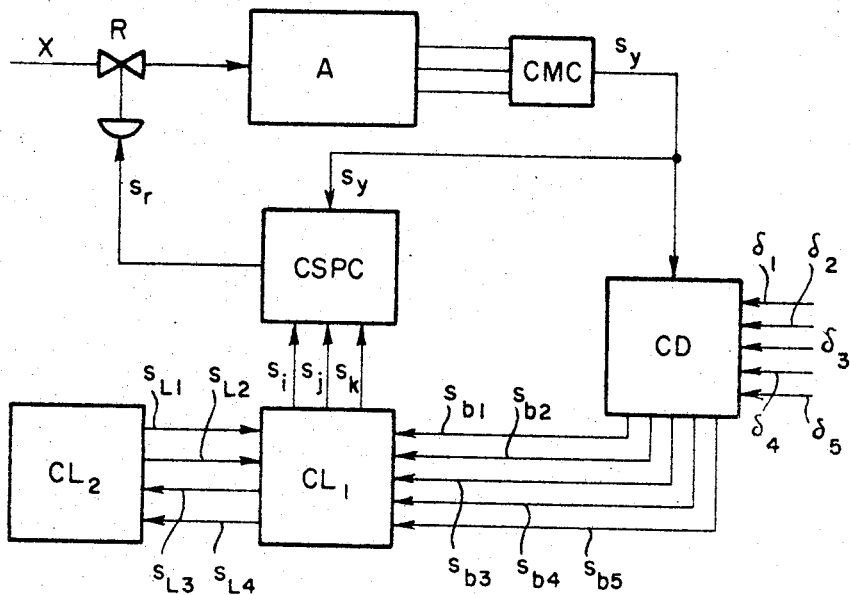
FIG. 9 is a functional diagram of a second embodiment of the apparatus according to the invention.

In FIG. 9, showing diagrammatically a second embodiment of the apparatus according to the invention, the same references have been used as in FIG. 1 to designate components that are common to both embodiments.

FIG. 9 shows an instllation A whose operation is optimalized by acting on a regulating element R, the value of the regulating quantity set by element R being made dependent on a signal $s_r$. This signal is generated by the optimalizing apparatus which comprises the following component circuits:

(a) a measuring and calculating circuit CMC;
(b) a triggering circuit CD;
(c) a main logic circuit $CL_1$;
(d) an auxiliary logic circuit $CL_2$; and
(e) a combined selection, disturbance and control circuit CSPC.

Circuit CMC serves to elaborate, in the same way as described earlier, a signal $s_y$ which is proportional to a linear algebraic combination of three signals $s_{Y}$, $s_{Y'}$, $s_{Y''}$ obtained from the instantaneous value of the operating criterion Y for which the extremum is to be obtained. Thus, block CMC of FIG. 9 represents a circuit analogous to that shown in FIG. 2.

Similarly, the triggering circuit CD shown in FIG. 9 receives signal $s_y$ from circuit CMC and the five reference signals $\sigma_1$, $\sigma_2$, $\sigma_3$, $\sigma_4$ and $\sigma_5$ and generates five triggering signals $s_{b1}$, $s_{b2}$, $s_{b3}$, $s_{b4}$, and $s_{b5}$ which are fed to the main logic circuit $CL_1$. The latter generates, like circuit CL of FIG. 1, three selection signals $s_i$, $s_j$ and $s_k$ which are transmitted to the selection, disturbance and control circuit CSPC. The latter also receives the pilot signal $s_y$ and generates a control signal $s_r$ for the regulating element R.

The auxiliary logic circuit $CL_2$ receives two logic signals $s_{L3}$ and $s_{L4}$ from the primary logic circuit $CL_1$ and generates two logic signals $s_{L1}$ and $s_{L2}$ which are transmitted to the circuit $CL_1$.

The circuit CD represented in FIG. 9 fulfills a function which is identical to the equivalent circuit of the FIG. 1 apparatus and consequently remains unchanged in relation to its constructional form represented in FIG. 3 and described above.

Figure 11:
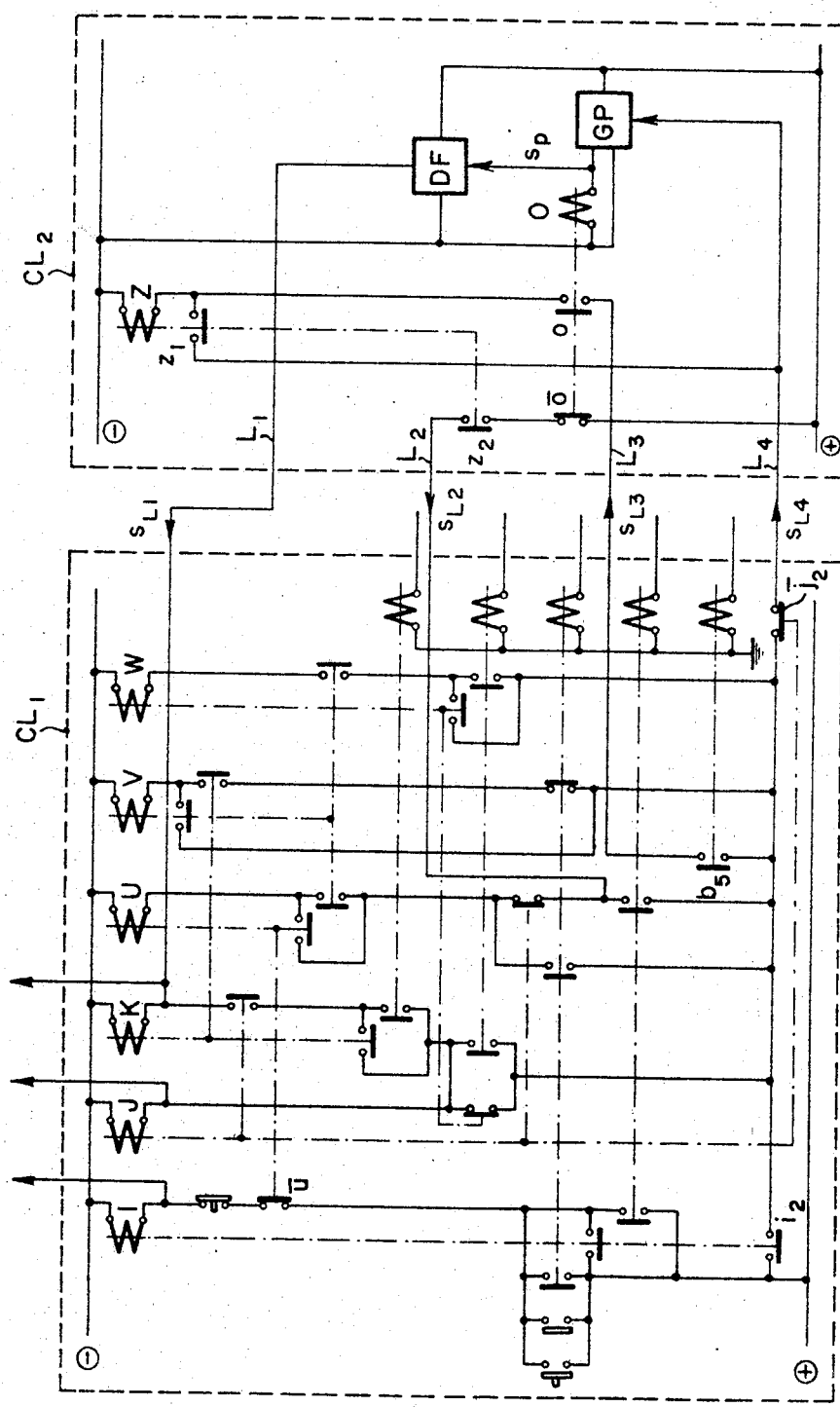
FIG. 11 shows a constructional form for the logic circuits $CL_1$ and $CL_2$ of FIG. 9.

As will be seen from FIG. 11, the main logic circuit $CL_1$ is identical to the circuit CL shown in FIG. 4 except that the lines $L_1$ to $L_4$ have been connected to the connection lines of the relay energizing circuits as shown in this figure. Further, a contact $\bar{j}_2$, which is normally closed and which opens when relay J is energized, is mounted in line $L_4$.

The logic circuit $CL_2$, which is shown in FIG. 11, serves to control the searching phase for finding the optimum by continuous periodic disturbance. It comprises a generator GP, which produces a square shaped periodic signal $s_p$ which causes periodic energization of the relay O when receiving from the primary logic circuit $CL_1$ a triggering signal $s_{L4}$ via line $L_4$.

Energization of relay O causes contact $\bar{o}$ to open and contact $o$ to close. The periodic signal $s_p$ is simultaneously fed to a frequency divider which generates a signal $s_{L1}$ having a period which is twice as large and hence a frequency twice as small as those of the signal $s_p$. Line $L_1$ transmits this signal $s_{L1}$ to the energizing circuit of relay K in the primary logic circuit $CL_1$ (see FIG. 11). The secondary logic circuit $CL_2$ moreover comprises a relay Z which is energized when line $L_3$ is live ($s_{L3}=1$) and relay O is energized. Relay Z controls the closure of a contact $z_2$ and is kept energized by a contact $z_1$.

Figure 10:
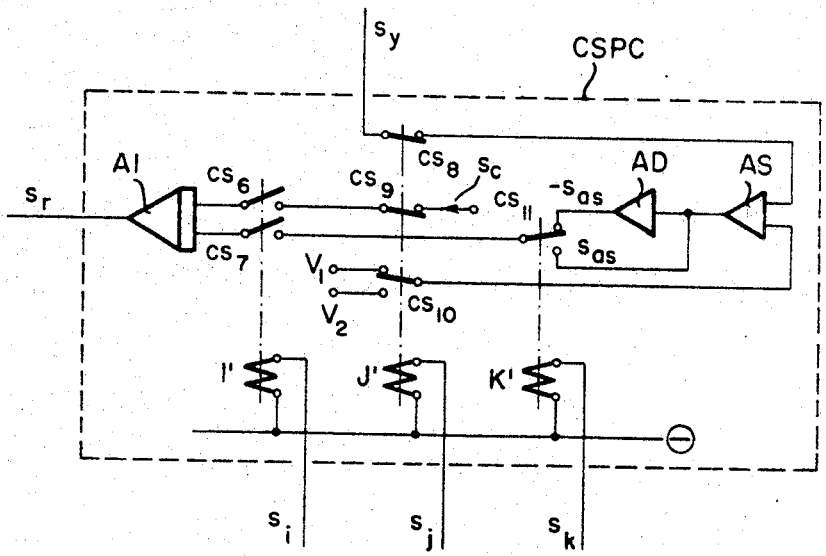
FIG. 10 shows a constructional form for the combined selector, disturbance and control circuit of FIG. 9.

The selection, disturbance and control circuit CSPC shown in FIG. 10 comprises, as in the previous case, three secondary relays I', J' and K' which are energized when they respectively receive signals $s_i$, $s_j$ and $s_k$ from the primary logic circuit $CL_1$ and which respectively control selection contacts $cs_6$, $cs_7$, $cs_8$, $cs_9$ and $cs_{10}$; and $cs_{11}$.

This circuit further comprises two voltage sources $V_1$ and $V_2$ of different values which are selectively connected, depending on the position of switch $cs_{10}$, to the input of a summing amplifier AS. The latter simultaneously receives the pilot signal $s_y$ when contact $cs_8$ is closed (i.e., when relay J' is not energized) and generates an amplifying signal $s_{as}$ which is transmitted to a reversing element AD. The two signals $+s_{as}$ and $-s_{as}$ are respectively transmitted to one of the terminals of contact $cs_{11}$ which conveys one of these signals to the input of an integrating amplifier AI when contact $cs_7$ is closed through energization of relay I'. In the latter instance, the integrating amplifier AI simultaneously receives a reference signal $s_c$ via contacts $cs_6$ and $cs_9$, relay I' being energized and relay J' being de-energized. The integrating amplifier AI elaborates a control signal $s_r$ which actuates the regulating element R so as to carry out the optimum searching cycle.

Figure 2:
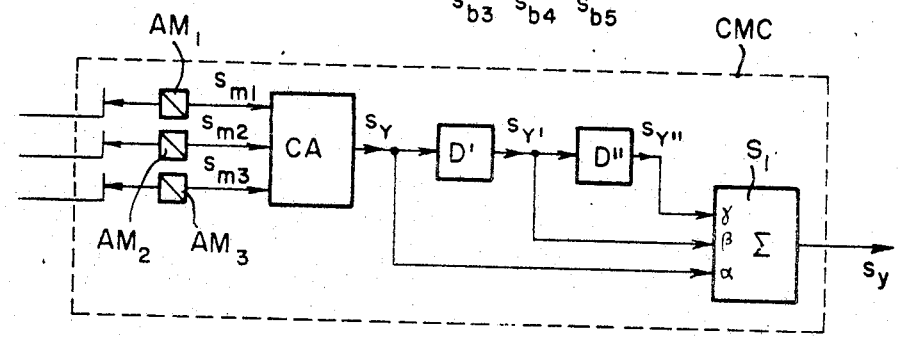
FIG. 2 shows a constructional form for the calculating and measuring circuit CMC of FIG. 1.

In the following description of the operation of the apparatus shown in FIGS. 9 to 11, it has been considered unnecesary to repeat the description of the operation of circuits CMC and CD which is identical to that of the corresponding circuits which have previously been illustrated and discussed in relation to FIGS. 2 and 3.

As in the previous case, the apparatus shown in FIGS. 9 to 11 is at rest in the waiting stage, i.e., the stage in which the control signal $s_r$ is constant and the regulating quantity also remains constant.

Similarly, the dynamic searching phase is triggered off either by a manual signal $s_m$ or a clock signal $s_t$, or by a signal $s_{b3}$ or $s_{b4}$ coming from the triggering circuit CD. During the two phases of the reaching cycle, the primary relay I and hence relay I' are energized, thereby closing the contacts $cs_6$ and $cs_7$ and connecting the integrating amplifier AI to one or other of the voltage sources $V_1$ and $V_2$. During the dynamic searching phase, relay J and hence relay J' are energized and actuate contacts $cs_8$, $cs_9$ and $cs_{10}$ whereby the summing amplifier AS may be connected to the voltage source $V_2$ via contact $cs_{10}$, and whereby contacts $cs_8$ and $cs_9$ may open to prevent, during this entire dynamic phase, signals $s_y$ and $s_c$ from reaching the summing amplifier AS and the integrating amplifier AI, respectively. As long as the threshold $\sigma_1$ has not been crossed by signal $s_y$, relay K remains de-energized, since contact $b_1$ is open. As a result, the switch $cs_{11}$ remains in the position shown in FIG. 10.

Until threshold $\sigma_1$ is reached, the integrating amplifier AI thus receives the $V_2$ voltage. At the threshold $\sigma_1$, contact $b_1$ closes, relay K becomes energized, and hence relay K' also becomes energized and changes the position of switch $cs_{11}$ to apply the $-V_2$ voltage to the integrating amplifier AI. Contacts $i_2$ and $k_2$ being closed, the relay V becomes energized when the amplitude of signal $s_y$ drops below the boundary value $\sigma_3$. When threshold $\sigma_2$ is crossed for the first time, contact $b_2$ closes, thereby energizing relay W, contact $i_1$ and $v_3$ being closed. Relay W remains energized through contact W, relay J remains energized via contacts $i_2$ and $b_2$ and relay K remains energized via contacts $i_2$, $b_2$, $k_1$ and $j$.

When threshold $\sigma_2$ is crossed for the second time by signals $s_y$, the dynamic searching phase ends, signal $s_{b2}$ becomes nil again, relay $B_2$ is de-energized and relays J and K are de-energized by the opening of contact $b_2$. As a result, contact $cs_8$ closes and transmits signal $s_y$ to the input of the summing amplifier AS, contact $cs_9$ transmits the reference signal $s_c$ to the integrating amplifier AI and switch $cs_{10}$ connects voltage source $V_1$ to the input of the summing amplifier AS.

The de-energization or relay J closes contact $\bar{j}_2$ (see FIG. 11), thereby producing the supply signal $s_{L4}$ for the secondary logic circuit $CL_2$ which controls the continuous periodic disturbance searching phase. Signal $s_{L4}$ ensures voltage supply to the circuit $CL_2$, in particular to the generator GP and to the frequency divider DF. The square periodic signal $s_{L1}$, emitted by the divider DF, thus causes periodic energization of relay K and hence of relay K' which causes periodic actuation of switch $cs_{11}$, thereby alternately applying voltages $+(V_1+s_y)$ and $-(V_1+s_y)$ to the input of the integrator.

It will be observed that in the above described selection, disturbance and control circuit CSPC, the group consisting of the summing amplifier AS, of the reversing amplifier AD and of the switch $cs_{11}$ controlled by relay K', serves, during the second searching phase, both to generate a first, square shaped, periodic signal and to elaborate a second signal which is proportional to the product of the pilot signal $s_y$ and of this first square signal. The sum of these two signals, added to signal $s_c$, is integrated in the integrating amplifier AI to produce the control signal $s_p$ for the regulating quantity X.

As pointed out above, the square signal $s_p$ produced by the generator GP and transmitted to the divider DF (see FIGS. 11 and 12) has a frequency which is double that of the signal $s_{L1}$ emitted by this divider. This signal $s_p$ simultaneously causes the periodic energization of relay O. The latter controls the periodic actuation in opposite directions of contacts $\bar{o}$ and $o$.

Figure 12:
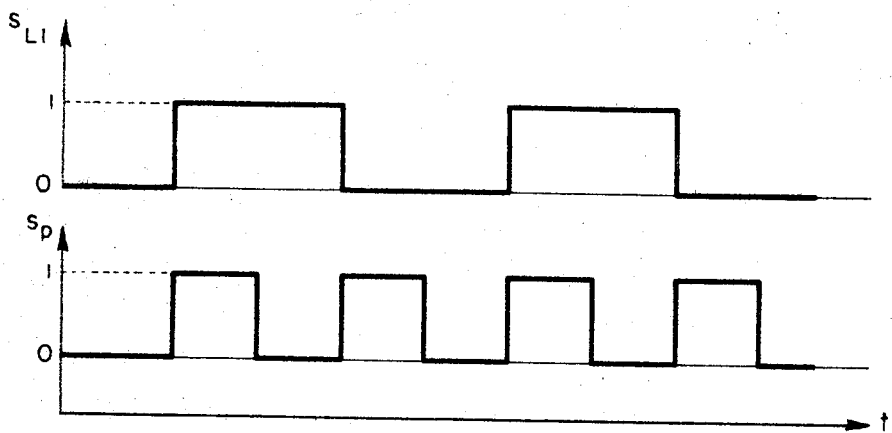
FIG. 12 is an explanatory diagram in connection with the periodic disturbance signals.

Considering the two synchronized signals $s_{L1}$ and $s_p$, the progress of which is illustrated in FIG. 12 in terms of time $t$, it will be observed that each time $s_p$ passes from 0 to 1, $s_{L1}$ passes from 1 to 0, and vice versa. But when $s_p$ passes from 1 to 0, there is no change in the state of $s_{L1}$. Thus the passage from 1 to 0 of signal $s_p$ makes it possible to determine the middle of the time interval between two successive switching operations for changing the direction of the variation of quantity X, so that the searching cycle may be stopped half-way between two successive switching operations.

The searching phase by continuous periodic disturbance ends as follows. When signal $s_y$ reaches the value of reference signal $\sigma_5$, relay $B_5$ is energized by signal $s_{b5}$, and contact $b_5$ is hence closed thereby enabling (signal $s_{L3}$) relay Z of circuit $CL_2$ (FIG. 11) to be energized. This energization of relay Z takes place either immediately when relay O is in an energized state and contact $o$ is closed, or when the relay O becomes energized. Moreover, when relay O is deenergized, contact $\bar{o}$ closes, contact $z_2$ remaining closed since relay Z is kept energized via contact $z_1$. This results in relay U being energized via the positive line of circuit $CL_2$ and via line $L_2$. Relay U, through being so energized, causes the optimum search to be stopped by opening contact $\bar{u}$, since this causes the deenergization of relay I, the opening of contact $i_2$ and the deenergization of all of the relays in circuits $CL_1$ and $CL_2$. The integrating amplifier AI is thus disconnected with consequent passage to the waiting phase in which the control signal is nil and the regulating quantity is unaffected by the above described apparatus.

It will be observed that this second apparatus causes, as in the case of the apparatus illustrated in FIGS. 1 to 7, the searching cycle to be interrupted and to be restarted when a substantial disturbance occurs in the installation.

Figure 13:
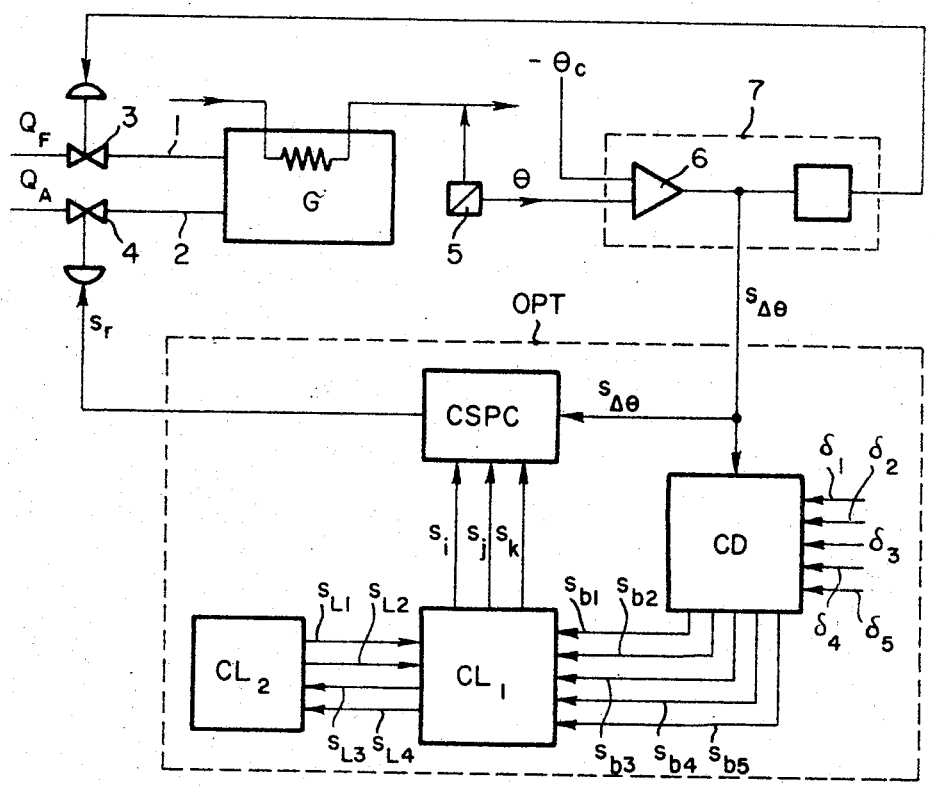
FIG. 13 is a functional diagram of a third embodiment of the apparatus according to the invention, applied to a heat generator.

The apparatus shown in FIG. 13 is adapted to optimalize combustion in a heat generator G. The latter is supplied with fluid fuel and with air via conduits 1 and 2 in which the throughputs $Q_F$ and $Q_A$ are respectively controlled by valves 3 and 4.

In the present instance, as indeed in the majority of combustion processes, the operating criterion to be rendered extremal, i.e., minimal, is fuel consumption. At the same time, the temperature ⓗ of a fluid being heated in the generator has to be kept at an index value ⓗ$_c$. The instantaneous value of this temperature is measured by the measuring instrument 5 which sends a corresponding signal ⓗ to an operational amplifier 6. The latter simultaneously receives a signal $-$ⓗ$_c$ corresponding to the index value of said temperature and generates a signal $s_{\Delta\text{ⓗ}}$, termed error signal, which is proportional to the difference ⓗ$_c$−ⓗ. The amplifier 6 forms part of a proportional plus integral plus derivative control action means 7, termed herein P.I.D. controller, which controls the fuel valve 3 in dependence on the error signal $s_{\Delta\text{ⓗ}}$. This signal is also transmitted to the optimization apparatus OPT which comprises a triggering circuit CO, logic circuits $CL_1$ and $CL_2$ and a selection, disturbance and control circuit CSPC. These circuits correspond exactly, as regards their function, to the circuits CD, $CL_1$, $CL_2$ and CSPC of FIG. 9. Their construction can therefore be similar to those shown in FIGS. 3, 10 and 11.

Signal $s_r$ which is generated by the optimalizer OPT during its searching cycle, acts on the air valve 4 in order to determine the optimal air input $Q_{A_0}$ for a minimal input $Q_{F0}$ of fuel required to keep the heated fluid at the index temperature ⓗ$_c$.

It should be noted that elements 5, 6 and 7 forming the control loop for the input flow of fuel $Q_F$ are well known. In the present arrangement, the error signal $s_{\Delta\text{ⓗ}}$ is used as a pilot signal to carry out the optimum searching cycle. The relationship between this signal $s_{A(H)}$ and the operating criterion $Q_F$ having to be optimalized is determined by the P.I.D. controller 7. If the general formula for this controller is worked out for the present case, the following relationship is obtained:

$$Q_F = k_1 \Delta \textcircled{H} + k_2 \int_0^t \Delta \textcircled{H} dt + k_3 \frac{d\Delta \textcircled{H}}{dt}$$

in which $k_1$, $k_2$ and $k_3$ are constants, $Q_F$ is the instantaneous input flow of fuel, $\textcircled{H}$ is the instantaneous temperature and $\Delta \textcircled{H}$ is the above mentioned difference between the index temperature $\textcircled{H}_c$ and the instantaneous temperature $\textcircled{H}$. Differentiation of the above equation with respect to time gives:

$$dQ_F/dt = k_1 \frac{d\Delta \textcircled{H}}{dt} + k_2 \Delta \textcircled{H} + k_3 \frac{d^2 \Delta \textcircled{H}}{dt}$$

$$= k_2 \Delta \textcircled{H} + \left| k_1 \frac{d\Delta \textcircled{H}}{dt} + k_3 \frac{d_2 \Delta \textcircled{H}}{dt} \right|$$

As is known, in P.I.D. controllers, the proportional and derivative actions are transitional, whereas the integral action sustains itself even when the error signal becomes nil. Thus, considering, as a first approximation, the permanent term only, the following equation is obtained:

$$\frac{dQ_F}{dt} = k_2 \Delta \textcircled{H}$$

meaning that the signal $s_{A(H)}$ which is elaborated in this application is essentially a linear function of the first time derivative of the operating criterion $Q_F$ it is desired to minimalize. In this way, the elements 5, 6 and 7 of the loop for controlling the input flow $Q_F$ of fuel make it possible to dispense with the measuring and calculating circuit CMC shown in FIG. 2.

The above described arrangement thus enables optimal control of the generator in a manner which is both simple and quick, by also using the signal $s_{A(H)}$, elaborated in the P.I.D. controller 7, as a pilot signal for the optimum search cycle.

Figure 14:
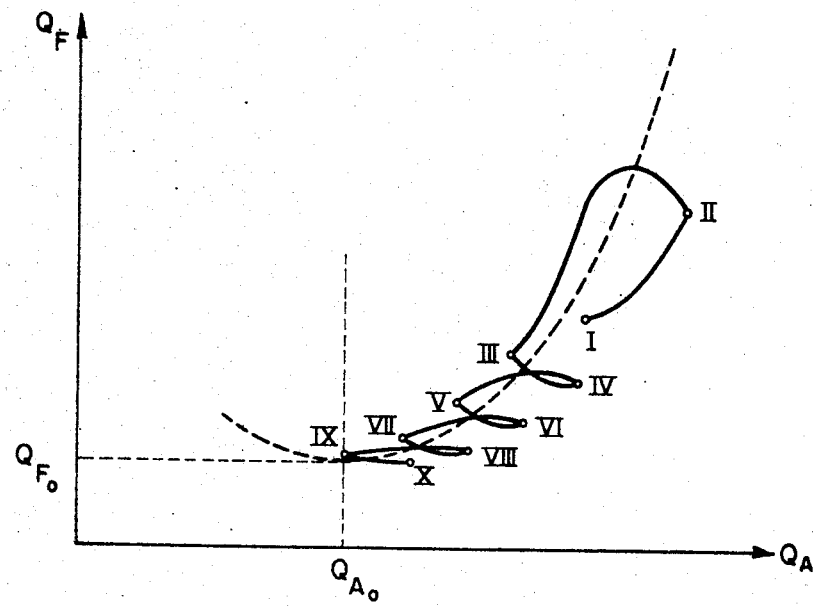
FIG. 14 represents an aptimum searching cycle carried out by the apparatus of FIG. 13.

The curve shown in broken lines in the graph of FIG. 14 is a static characteristic of the heat generator G. This characteristic shows the relationship between the fuel and air inputs $Q_F$ and $Q_A$. As was explained earlier, such a characteristic is determined by the other parameters of the process under consideration, e.g., by the physical characteristics of the combustion means, or by the load on the generator. The evolution of the signal $s_{A(H)}$ with respect to time $t$ during a searching cycle to find the optimal working conditions of this heat generator, corresponds essentially to that shown in FIG. 8, signal $s_{A(H)}$ then being the pilot signal $(s_y)$. The dynamic searching phase begins in all cases by a progressive increase of the combustion air input (so as to avoid the danger of explosion in the generator furnace through an excess of fuel) by carrying out the searching cycle exclusively in the zone of excess air working conditions, i.e., to the right of the abscissa indicated in broken lines and passing through the optimal working state corresponding to point $Q_{F_0}$, $O_{A_0}$. The above progressive increase of the air input results in a drop in furnace temperature and hence in temperature $\textcircled{H}$ of the heated fluid. The signal $s_{A(H)}$ increases positively and when it reaches a positive switching threshold corresponding to the reference signal $\sigma_1$, the direction of the progressive variation is reversed (at point II) and the air input decreases progressively, passes through O and reaches for the first time a second negative boundary value, i.e., that of signal $\sigma_2$. Clearly, the value of $\Delta \textcircled{H}$ and hence the amplitude of signals $s_{A(H)}$ cannot increase indefinitely as a result of the air input decrease. Thus $s_{A(H)}$ reaches a negative maximal value and decreases to reach for the second time the negative value $\sigma_2$ (at point III, FIG. 8). At this point, the dynamic searching phase is over and the searching phase by continuous periodic disturbance of the air input (III to X, FIG. 8) is begun so as slowly to bring the generator to its optimal working state $Q_{F_0}$, $Q_{A_0}$. To prevent the generator from operating in the air deficiency zone, i.e., in the prohibited zone to the left of the optimum $Q_{F_0}$, $Q_{A_0}$, in FIG. 14, the second searching phase is stopped at point X where signal $s_{A(H)}$, from which the periodic fluctuations and the noises have first been filtered, reaches a value corresponding to signal $\sigma_5$ which is at a level lower than the maximal amplitude of these noises. At point X, the generator is operating at near optimal working conditions and is kept in this state until the other (nonregulated) parameters of the generator vary again and thus require working at the optimum of another characteristic curve, i.e., a fresh optimum searching cycle is carried out.

Although industrial heating is an important field of application for the present invention, the latter can with advantage also be applied to highly differing processes. In its application to a chemical reaction, for example, the operating criterion to be optimalized could be the efficiency of the reaction or the quality of one of its products. The quantity which is acted upon to achieve optimalization, i.e., the regulating quantity, should of course be capable of being regulated very quickly if the dynamic searching made possible by the method according to the invention is to be put to best advantage.

Clearly, the invention could also be used to optimize an operating criterion by controlling a plurality of regulating quantities. In such a case, the dynamic searching phase is carried out successively for each of the different regulating quantities and the searching phase by continuous periodic disturbance is carried out simultaneously for all of these quantities. Apparatus for carrying out such optimalization would comprise individual disturbance, selection and control circuits for each regulating quantity. On the other hand, common measuring and calculating circuits, detection circuits and logic circuits can be provided for all of its regulating quantities.

It should be noted that the method according to the invention has the advantage of being able to approach the optimal working point very quickly while enabling the latter to be found very accurately. As is known, this last condition plays a crucial role in numerous processes, particularly those where there is a danger of explosion. Thus, for instance, in industrial furnaces, it is essential to avoid operation under air defficiency conditions so as to avoid the build-up of explosive mixture pockets. To make these furnaces safe to operate, it has been necessary up till now to increase the air intake substantially beyond the stoichiometric ratio, i.e., to operate the furnace under working conditions far removed from optimal conditions.

With the rapid optimum approaching phase followed a slow approaching phase, as provided in the method according to the invention, it thus becomes possible to arrive at the optimum in a manner which is both quick and accurate.

Various modifications can be made to the described apparatus. For instance, the illustrated relays can be replaced by other bistable elements, as for example electronic elements using semiconductors, or by binary modules using a fluid, in particular compressed air. Similarly, the amplifiers, the adders and the integrator mentioned earlier can be made up of analog or numerical calculating devices using either electrical circuits or pneumatic or hydraulic circuits. Thus, for instance, integration in the control circuit can be carried out by impulse counts or by counting the level variations of a binary signal. Finally, the above described circuits can also be replaced by computer components, the operations to be carried out by these components being then defined by programming means that are independent or are incorporated in an arrangement carrying out other computing and controlling operations.

We claim:

1. Control apparatus for optimum operation of an installation, as defined by a maximum or minimum value of an operating criterion thereof, by varying at least one regulating variable of the installation, through the intermediary of a signal responsive regulating element associated with said installation, in accordance with an optimum searching cycle, which includes a first dynamic searching phase and a second phase by continuous periodic disturbance, which apparatus comprises: measuring and calculating means adapted for connection to said installation to produce continuously a pilot signal having a value which is a linear function of at least one of three quantities, namely the instantaneous value of the criterion, its first time derivative and its second time derivative; periodic disturbance circuit means connected to said measuring and calculating means to receive therefrom said pilot signal and adapted to produce a first, periodic, disturbance signal and a second disturbance signal corresponding to the product of the pilot signal and of said first, periodic, disturbance signal; control circuit means adapted for connection to said regulating element and comprising integrating and adding means connected to said element to deliver thereto a control signal for controlling said regulating variable; selector circuit means for selectively connecting said control circuit means to said voltage means during said first searching phase, such that said voltage means during said first searching phase, such that said control signal is made to vary progressively in accordance with a predetermined commutation law, and to said periodic disturbance circuit means during said second phase, such that said control signal is made to vary in dependence on said first, periodic, disturbance signal and on the time integral of said second disturbance signal; and trigger and logic circuit means connected to said measuring and calculating means to receive therefrom said pilot signal and connected to said selector circuit means to deliver thereto selection signals produced therein for controlling said searching cycle, said trigger and logic circuit means including reference signal source means for supplying a plurality of constant value reference signals, a periodic trigger signal source, and a corresponding plurality of bistable triggers each for comparing said pilot signal with one of said reference signals and for delivering a triggering signal when said pilot signal reaches the value of said one reference signal, said trigger and logic circuit means being adapted to deliver: a cycle starting selection signal to trigger off said first, dynamic, searching phase through connecting said control circuit to said voltage means given time intervals determined by said periodic trigger signal source and each time said pilot signal reaches either a first, positive, boundary value or a second, negative, boundary value, respectively, corresponding to a first and second of said reference signals, at least one commutating selection signal to inverse the sense of progression of said control signal, during said first searching phase, when said pilot signal reaches a third boundary value corresponding to a third of said reference signals, a periodic disturbance selection signal to trigger off said second phase, through disconnecting said control circuit means from said voltage means and connecting said control circuit means to said periodic disturbance circuit means, when the amplitude of said pilot signal passes, while decreasing through a fourth boundary value corresponding to a fourth of said reference signals, and a cycle-ending selection signal to stop said second searching phase when the aperiodic component of the pilot signal reaches a fifth boundary value corresponding to a fifth of said reference signals.

2. Apparatus according to claim 1, in which said triggering and logic circuit means comprises eleven bistable switching elements of which five are auxiliary elements, each controlled by one of said triggering signals which are associated with three intermediate elements so as to control three main elements for delivering said selection signals, a first and second auxiliary element being adapted to control a first and second main element to deliver said cycle-starting selection signal, a third auxiliary element being adapted to control a third main element to deliver said commutating selection signal, and a fourth and fifth auxiliary element being respectively adapted to control said intermediate elements to cause said main elements to deliver said periodic disturbance and cycle-ending selection signals.

References Cited

UNITED STATES PATENTS

| | | | |
|---|---|---|---|
| 3,152,602 | 10/1964 | Hackman | 235—150.1 |
| 3,346,726 | 10/1967 | Rouxel et al. | 235—150.1 |
| 3,389,243 | 6/1968 | Peschon | 235—150.21 X |

EUGENE G. BOTZ, Primary Examiner

R. W. WEIG, Assistant Examiner

U.S. Cl. X.R.

235—150.21

UNITED STATES PATENT OFFICE
CERTIFICATE OF CORRECTION

Patent No. 3,510,635          Dated May 5, 1970

Inventor(s)  ROLAND ROUXEL, CLAUDE SOURISSE

It is certified that error appears in the above-identified patent and that said Letters Patent are hereby corrected as shown below:

Column 13, lines 26 and 27; delete "such that said voltage means during said first searching phase,"

Column 14, line 1; insert after "means" --at--

Signed and sealed this 4th day of May 1971.

(SEAL)
Attest:

EDWARD M. FLETCHER, JR.                WILLIAM E. SCHUYLER, JR.
Attesting Officer                      Commissioner of Patents